United States Patent [19]

Baba

[11] Patent Number: 4,891,691
[45] Date of Patent: Jan. 2, 1990

[54] STILL IMAGE COLOR SEQUENTIAL PHOTOGRAPHIC APPARATUS

[75] Inventor: Tatsuro Baba, Ootawara, Japan
[73] Assignee: Kabushiki Kaisha Toshiba, Kawasaki, Japan
[21] Appl. No.: 143,653
[22] Filed: Jan. 13, 1988

[30] Foreign Application Priority Data

Jan. 14, 1987 [JP] Japan .................................. 62-4916

[51] Int. Cl.⁴ .......................... H04N 1/46; H04N 5/84
[52] U.S. Cl. ........................................ 358/75; 358/244
[58] Field of Search ...................... 358/75, 244, 244.1, 358/244.2

[56] References Cited

U.S. PATENT DOCUMENTS

| | | | |
|---|---|---|---|
| 4,438,453 | 3/1984 | Alston | 358/75 |
| 4,468,693 | 8/1984 | Fujita et al. | 358/75 |
| 4,530,011 | 7/1985 | Haddick | 358/244 |
| 4,688,104 | 8/1987 | Wolcott | 358/244 |
| 4,694,355 | 9/1967 | Constable | 358/244 |
| 4,694,356 | 9/1987 | Constable | 358/244 |
| 4,740,833 | 4/1988 | Shiota et al. | 358/75 |
| 4,794,460 | 12/1988 | Shiota | 358/244 |

FOREIGN PATENT DOCUMENTS

53-33141 3/1978 Japan .................................. 358/75

Primary Examiner—James J. Grody
Assistant Examiner—Randall S. Svihla
Attorney, Agent, or Firm—Cushman, Darby & Cushman

[57] ABSTRACT

A color sequential photographic apparatus includes a monochrome display, an optical system, a filter unit, a variable aperture, a display controller, a switching controller, and a photographing controller. The optical system guides a display image on the display toward a color film. The filter unit sequentially selects three primary color filters, and inserts the selected filter in the optical system. The display controller controls the display luminance of the display. The switching controller controls the film exposure time of each image corresponding to three primary colors by sequentially displaying the images on the display during a predetermined interval while simultaneously operating the filter unit. The photographing controller controls at least one of the display controller, the variable aperture, and the switching controller, in accordance with a desired photographing condition.

12 Claims, 6 Drawing Sheets

STILL IMAGE COLOR SEQUENTIAL PHOTOGRAPHIC APPARATUS

BACKGROUND OF THE INVENTION

The present invention relates to a color sequential photographic apparatus for photographing a color still image such that a color film is exposed to sequential primary color images, constituting a color image, through a monochrome display and color filters for each color.

A color sequential photographic method is one method for photographing a color image. This method involves the use of a monochrome display and three primary color filters. Primary color images constituting a color image, e.g., R (red), G (green), and B (blue) images, are sequentially displayed on a monochrome display and are guided toward a color film through corresponding color filters. In other words, to obtain a color image, the color film is exposed in a color sequential manner, that is, in a manner wherein one primary color image is superposed on another.

A typical color sequential photographic apparatus receives R, G, and B image signals and vertical (V) and horizontal (H) sync signals, and performs photography in response to a photographing signal from a photographing instruction switch. The monochrome display, a black-and-white monitor is scanned by the V and H sync signals, and receives selected R, G, and B luminance signals, which it sequentially displays as R, G, and B images, respectively. When an R image is displayed, a color film is exposed to light passing through a red filter; when a G image is displayed, the color film is exposed to light passing through a green filter; and when a B image is displayed, the color film is exposed to light passing through a blue filter, thus obtaining a color photograph.

Such a color sequential photographic apparatus has a simple structure, can produce a sharp image, and permits good color saturation.

A disadvantage of the color sequential photographic apparatus is the long photographing time; the conventional apparatus requires from approximately 30 sec. to one minute to photograph a one-frame color image. As a result, there has been increasing demand for a color sequential photographic apparatus which can produce a photograph in a much shorter time.

In various photographing situations, demands have arisen for realizing photographing modes giving priority to color saturation, to prevention of image blurring, and the like. However, the conventional color sequential photographic apparatus cannot meet these demands.

SUMMARY OF THE INVENTION

It is an object of the present invention to provide a color sequential photographic apparatus which can meet demands for realizing photographing modes giving priority to a decrease in photographing time, color saturation, sharpness of image (reduction in blurring), and the like.

A color sequential photographic apparatus of the present invention comprises a means for variably controlling at least one of a display luminance of a monochrome display, an aperture value of a variable aperture, and a film exposure time in accordance with a desired photographing condition.

In the color sequential photographic apparatus, an exposure amount of light focused on one point of a film through a path of one point on a screen of the monochrome display, a filter, and a lens has the following relation:

$$E = K \times \{(I_{MON} \times T_{EXP})/(f_{NO})^2\} \quad (1)$$

where E is an exposure amount, $I_{MON}$ is a monitor luminance, $T_{EXP}$ is an exposure time, $f_{NO}$ is an aperture value (so-called f-number), and K is a constant.

Therefore, in order to obtain a predetermined exposure amount, at least one of the display luminance, aperture value, and exposure time can be controlled.

In order to shorten a photographing time, i.e., an exposure time, one or both of the display luminance and the aperture value can be appropriately adjusted. The monitor luminance, the exposure time, and the aperture value are parameters for determining gradation characteristics (so-called $\gamma$ characteristics) of an image, color saturation of an image, and blurring, i.e., sharpness of an image, respectively. Therefore, a photographing mode capable of obtaining a sharp image although it takes a relatively long period of time, and a photographing mode capable of obtaining an image with high color saturation although the $\gamma$ characteristics and/or sharpness are slightly degraded, can be performed by controlling the above three parameters.

According to the color sequential photographic apparatus of the present invention, a photographing mode for shortening a photographing time as short as possible, a photographing mode for obtaining a sharp image free from blurring although a photographing time is long, a photographing mode capable of obtaining an image with high color saturation although the image may be blurred, can be appropriately selected as needed.

DETAILED DESCRIPTION OF THE PREFERRED EMBODIMENTS

An embodiment of a color sequential photographic apparatus according to the present invention will be described with reference to the accompanying drawings.

Figure 1:
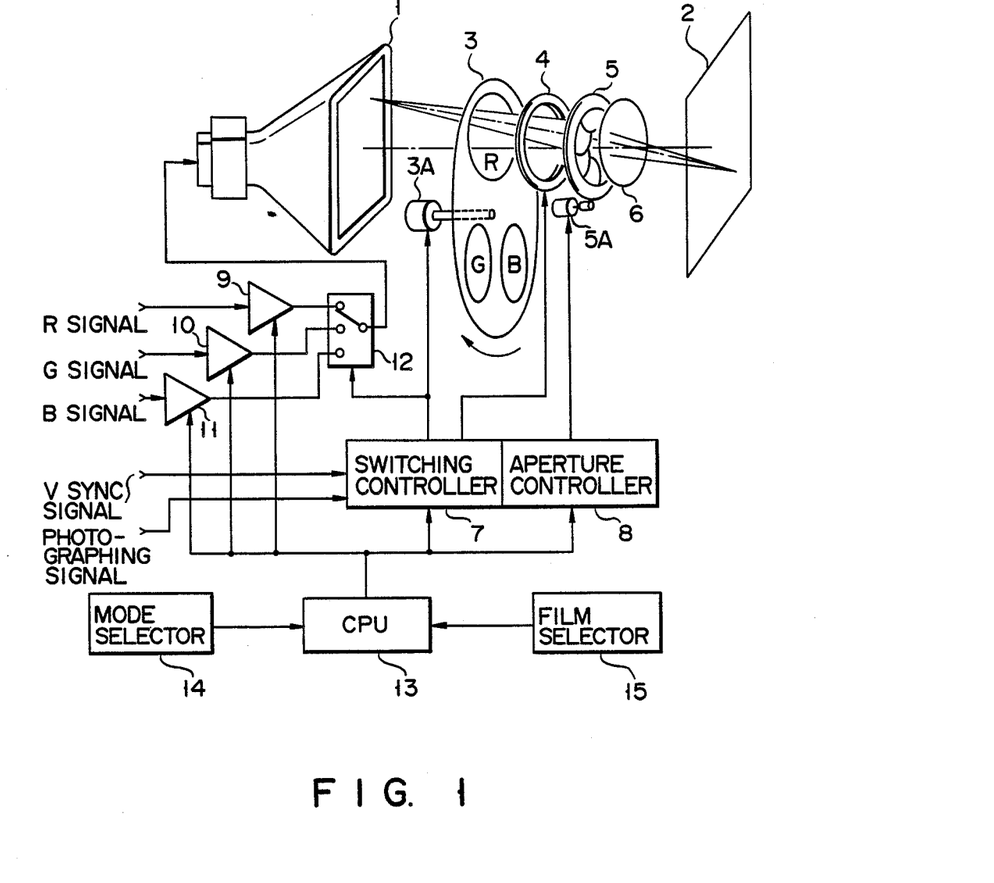
FIG. 1 is a block diagram of a color sequential photographic apparatus according to an embodiment of the present invention.
Figure 2A:
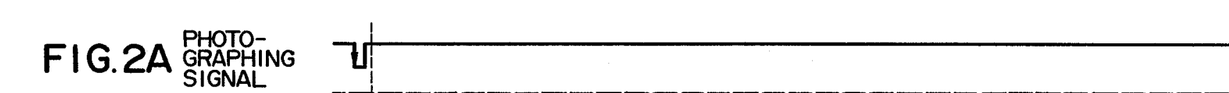
FIGS. 2A to 2F are timing charts for explaining an operation of the apparatus shown in FIG. 1.
Figure 2B:
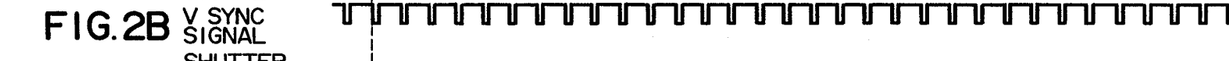
Figure 2C:
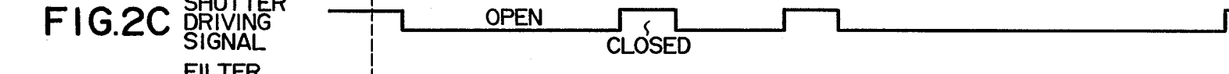
Figure 2D:
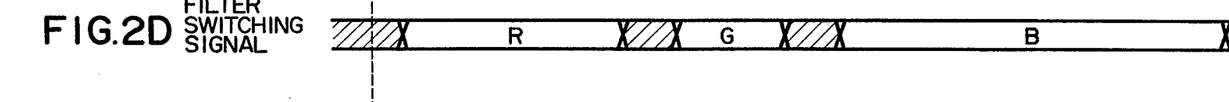
Figure 2E:
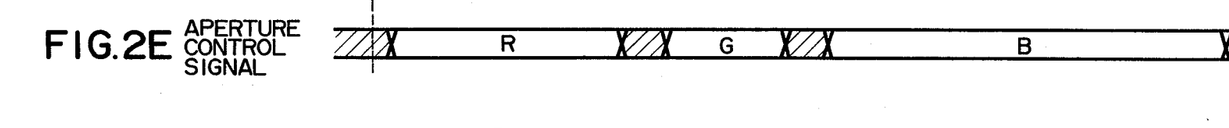
Figure 2F:
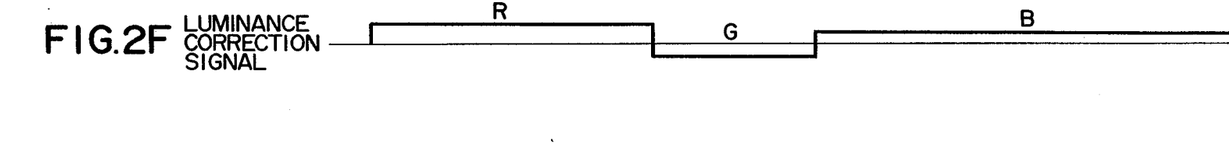

FIG. 1 is a block diagram of a color sequential photographic apparatus according to an embodiment of the present invention.

A color sequential photographic apparatus shown in FIG. 1 comprises black-and-white monitor 1, filter unit 3, shutter 4, variable aperture 5, lens 6, switching controller 7, aperture controller 8, variable gain amplifiers 9, 10 and 11, switch 12, photographing controller (CPU) 13, mode selector 14, and film selector 15.

Filters of filter unit 3, shutter 4, variable aperture 5, and lens 6 are arranged between black-and-white monitor 1 and film 2. Filter unit 3 is constituted by filters held by a rotary disk which is rotated by motor 3A. In filter unit 3, the rotary disk is rotated by motor 3A, and R, G, and B color filters are sequentially inserted in a photographing optical path between black-and-white monitor 1 and film 2. Motor 3A of filter unit 3 is controlled by switching controller 7. Shutter 4 is also ON/OFF-controlled by controller 7. Controller 7 receives a V sync signal of the H and V sync signals for display scanning, which are supplied to black-and-white monitor 1, and a photographing signal from a photographing instruction switch (not shown). An opening degree of aperture, i.e., an aperture value of variable aperture 5 is adjusted by motor 5A, which is controlled by aperture controller 8.

R, G, and B luminance signals are amplified at predetermined gains by amplifiers 9, 10, and 11, respectively. The amplified signals are selectively switched by switch 12, and are sequentially input to black-and-white monitor 1 in a predetermined order.

Gains $G_R$, $G_G$, and $G_B$ of amplifiers 9, 10, and 11, exposure times of R, G, and B images of switching controller 7, and R, G, and B aperture values of aperture controller 8 are set by photographing controller 13. Photographing controller 13 has an optimal photographing condition and calculation algorithm which are experimentally obtained in advance. Photographing controller 13 is connected to mode selector 14 and film selector 15, and can vary a photographing condition in accordance with inputs therefrom. Mode selector 14 is arranged to select a photographing mode in favor of a user. For example, the user can desirably select one of a photographing time priority mode in which a photographing operation can be performed in a short period of time, a sharpness priority mode capable of obtaining high sharpness, and a saturation priority mode capable of obtaining high saturation. Photographing controller 13 sets a photographing condition corresponding to a selected mode in accordance with setting of mode selector 14. Film selector 15 is used to set a type of film to be used (or a type of camera incorporating filters, a shutter, an aperture, and a lens; a film to be used can be determined depending on the type of camera). Photographing controller 13 sets an optimal photographing condition in accordance with the type of film, e.g., a normal 35 mm color negative film, or an instantaneous film in accordance with setting of film selector 15.

The operation of this apparatus will be described with reference to the timing charts shown in FIGS. 2A to 2F. In this case, assume that a control unit of the exposure time is a one-frame period, i.e., a pair of V sync signal periods ((1/30) sec in the NTSC method; (1/25) sec. in the PAL method). This is because, in a photographing operation of a television scanning monitor in a short period of time, variations in luminance due to a difference in number of times of repetition of scanning occur unless a photographing operation is performed in synchronism with the V sync signal.

In FIGS. 2A to 2F, setting of an aperture of the R filter, switching to the R filter of filter unit 3, switching of an input to black-and-white monitor 1 to an R signal, and setting of an R gain of amplifier 9 are performed in response to the trailing edge of the V sync signal immediately after the trailing edge of an input photographing signal. Shutter 4 is opened in response to the next trailing edge of the V sync signal, and after a predetermined exposure time has passed, shutter 4 is closed. Thereafter, the same operation is performed for G and B signals, and the photographing operation is completed.

In this embodiment, one or a plurality of the monitor luminance, exposure time, and aperture value are changed in accordance with the photographing condition, i.e., setting of photographing controller 13.

The principle of changing values of parameters as described above so as to establish various photographing conditions will now be described.

Figure 3A:
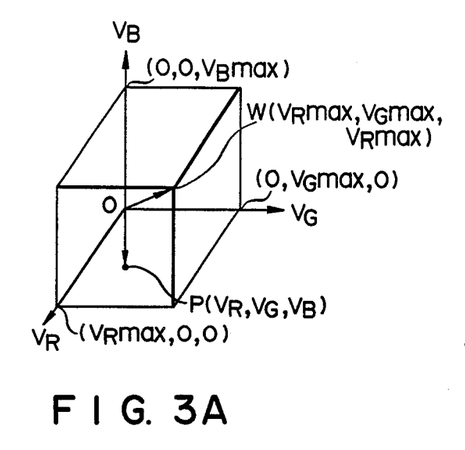
FIG. 3A is a graph showing a color coordinate system as a function of an input voltage.

FIG. 3A shows an RGB color coordinate system as a function of input voltages $V_R$, $V_G$, and $V_B$ of monitor 1. Point W of maximum luminance ($V_R$max, $V_G$max, $V_B$max) is defined as white on this coordinate system, and O→W is defined as a change in gradation of an achromatic color.

A case will be considered wherein arbitrary point P ($V_R$, $V_G$, $V_B$) on the screen of monitor 1 is photographed on a color film and is converted into R, G, and B coordinates Q (see FIG. 3C) on the film.

Figure 3B:
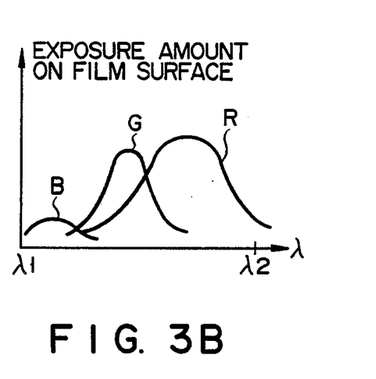
FIG. 3B is a graph showing spectral intensities of incident light on a film surface.

Assuming that gains of R, G, and B gain control are given as $G_R$, $G_G$, and $G_B$, R, G, and B aperture values (f-numbers) are given as $f_R$, $f_G$, and $f_B$, and R, G, and B exposure times are given as $T_R$, $T_G$, and $T_B$ (constant K is determined by an optical path of a photographic system, saturated luminance of monitor 1, sensitivity of film 2, and other factors), amounts of light in visible light regions $\lambda 1$ to $\lambda 2$ passing through R, G, and B filters and incident on point P on film 2, i.e., exposure amounts are distributed as shown in FIG. 3B.

If R, G, and B exposure amounts are given as $E_R$, $E_G$, and $E_B$, respectively, and spectral characteristics of light obtained from monitor 1 through the filters are given as $I_R(\lambda)$, $I_G(\lambda)$, and $I_B(\lambda)$, the exposure amounts are expressed as follows:

$$E_R = K \cdot \{(G_R \cdot T_R)/f_R^2\} \int_{\lambda_1}^{\lambda_2} I_R(\lambda)d\lambda \cdot V_R \quad (2)$$
$$= K_R' \cdot \{(G_R \cdot T_R)/f_R^2\} \cdot V_R$$

$$E_G = K \cdot \{(G_G T_G)/f_G^2\} \int_{\lambda_1}^{\lambda_2} I_G(\lambda)d\lambda \cdot V_G \quad (3)$$
$$= K_G' \cdot \{(G_G T_G)/f_G^2\} V_G$$

$$E_B = K \cdot \{(G_B T_B)/f_B^2\} \int_{\lambda_1}^{\lambda_2} I_B(\lambda)d\lambda \cdot V_B \quad (4)$$
$$= K_B' \cdot \{(G_B T_B)/f_B^2\} \cdot V_B$$

Figure 3C:
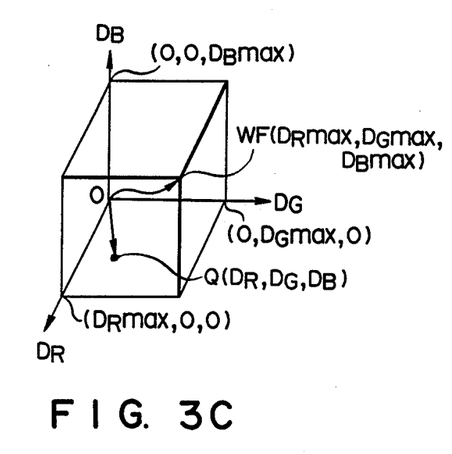
FIG. 3C is a graph showing an RGB color coordinate system on a film.
Figure 3D:
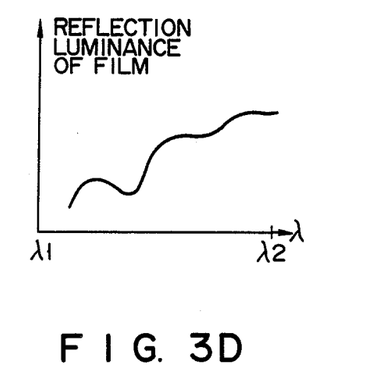
FIG. 3D is a graph showing reflection spectral characteristics of a film.

Since the spectral characteristics of R, G, and B luminance signals after they passed through the filters do not coincide with spectral sensitivity characteristics of pigments of film 2, reflection spectral characteristics of film 2 after photography are assumed to be as shown in FIG. 3D.

Therefore, the RGB color coordinate system of reflection colors of film 2 corresponds to the coordinate system of pigments of the film and is expressed by:

$$\begin{vmatrix} D_R \\ D_G \\ D_B \end{vmatrix} = A \cdot \begin{vmatrix} E_R \\ E_G \\ E_B \end{vmatrix}$$

Note that A cannot be a unit matrix (but is approximate to a unit matrix). In this case, for the sake of simplicity, A is approximate to the unit matrix, and is represented by:

$$A = \begin{vmatrix} K_R'' & 0 & 0 \\ 0 & K_G'' & 0 \\ 0 & 0 & K_B'' \end{vmatrix}$$

As a result, $$D_R = K_R'' \cdot K_R' \cdot \{(G_R \cdot T_R)/f_R^2\} \cdot V_R \quad (5)$$

$$D_G = K_G'' \cdot K_G' \cdot \{(G_G \cdot T_G)/f_G^2\} \cdot V_G \quad (6)$$

$$D_B = K_B'' \cdot K_B' \cdot \{(G_B \cdot T_B)/f_B^2\} \cdot V_B \quad (7)$$

then, $$D_R \propto \{(G_R T_R)/f_R^2\} \cdot V_R$$

$$D_{e1} \propto \{(G_G T_G)/f_G^2\} \cdot V_G$$

$$D_B \propto \{(G_B T_B)/f_B^2\} \cdot V_B$$

Therefore, reflection luminances DR, DG, and DB of the film can be independently controlled.

A criterion for determining a constant when input signal voltages P ($V_R$, $V_G$, $V_B$) are mapped on point Q ($D_R$, $D_G$, $D_B$) of the RGB coordinate system on the film is as follows.

When input signal voltages W ($V_R$max, $V_G$max, $V_B$max) corresponding to white of maximum luminance are converted to R, G, and B reflection luminances WF ($D_R$max, $D_G$max, $D_B$max) corresponding to white of maximum luminance on the film, W and WF respectively determine reference chromaticities and maximum luminances before and after conversion.

W and WF also determine constants $K_R''$, $K_R'$, $K_G''$, $K_G'$, $K_B''$ and $K_B'$ for causing the coordinate system (FIG. 3A) of input signal voltages $V_R$, $V_G$, and $V_B$ to correspond to the coordinate space (FIG. 3B) of reflection luminances $D_R$, $D_G$, and $D_B$ of the film.

Since R, G, and B exposure amounts and densities of the film have different curves, straight line OW of FIG. 3A becomes curve OWF in FIG. 3C and cannot always be a straight line.

With the above relationships, constants $K_R''$, $K_R'$, ... when voltages W are converted to luminances WF can be experimentally obtained. Therefore, when point P having arbitrary chromaticity and luminance in the coordinate space of the R, G, and B input signals is converted to point Q corresponding to the chromaticity and luminance on the film, the R, G, and B exposure amounts can be determined so that substantially the same chromaticity and luminance are obtained. Therefore, monitor luminances ($G_R$, $G_G$, $G_B$), exposure times ($T_R$, $T_G$, $T_B$), and aperture values ($f_R$, $f_G$, $f_B$), i.e., the parameters expressed in equation (1) can be appropriately adjusted independently of one another. It is thus possible to provide a color sequential photographic apparatus having the above three photographic modes.

Figure 4:
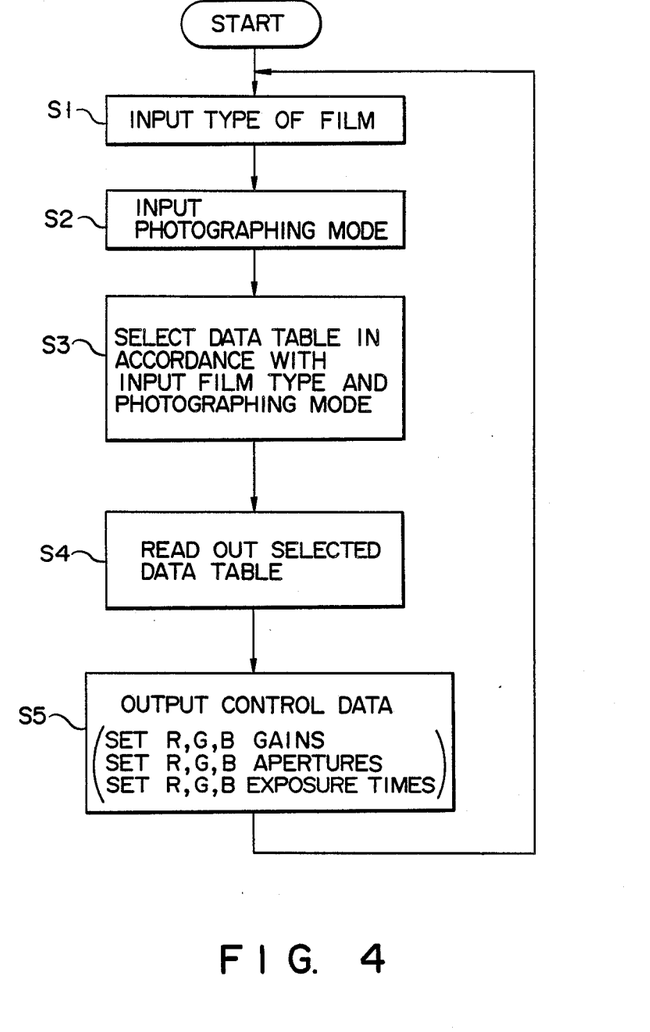
FIG. 4 is a flow chart showing processing in the apparatus shown in FIG. 1.

FIG. 4 shows the order of operation and processing in the color sequential photographic apparatus shown in FIG. 1.

After the photographing operation is started, the type of film is input from film selector 15 (S1), and a photographing mode is selected by a user (S2). Photographing controller 13 stores a plurality of control data tables corresponding to a plurality of types of films and photographing modes, which are experimentally obtained. Controller 13 selects a control data table in accordance with the selected type of film and the selected photographing mode (S3), reads out the corresponding table (S4), and outputs the readout control data (S5). In accordance with the output readout control data, R, G, and B gains $G_R$, $G_G$, and $G_B$ of amplifiers 9 to 11, R, G, and B aperture values $f_R$, $f_G$, and $f_B$, and R, G, and B exposure times $T_R$, $T_B$, and $T_G$ are set.

Figure 5:
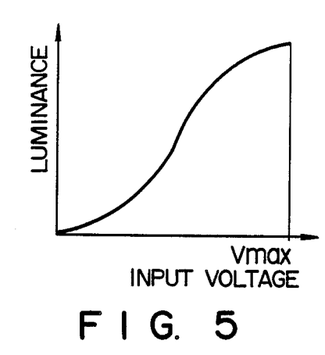
FIG. 5 is a graph showing the relationship between an input voltage and a luminance in a black-and-white monitor.
Figure 6:
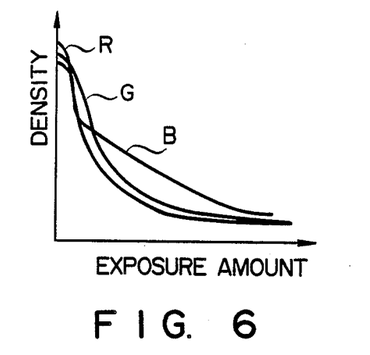
FIG. 6 is a graph showing the relationship between an incident luminance and a density of a film.
Figure 7:
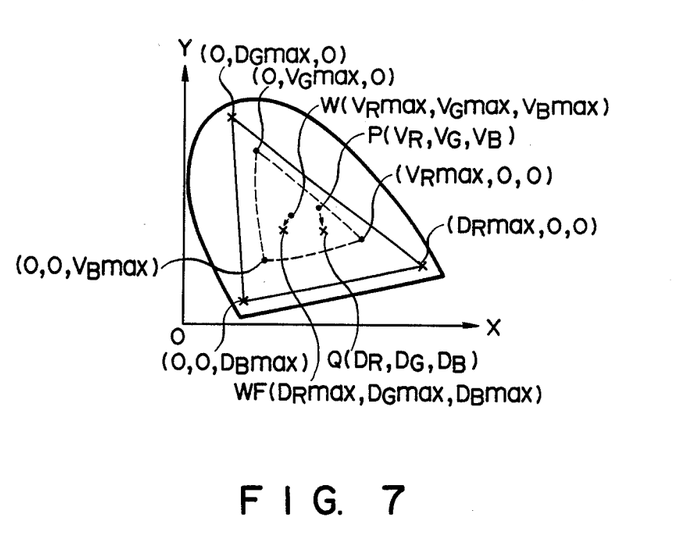
FIG. 7 is a CIE chromaticity diagram for explaining color representation regions.

FIGS. 5 to 7 are presented as a reference for understanding the principle of the present invention.

FIG. 5 shows the relationship between an input voltage and a luminance of black-and-white monitor 1. In FIG. 5, an input voltage is controlled along a $V^{2/3}$ curve in a low-luminance region, but is saturated in a high-luminance region since an ABL (Automatic Beam Limiter) in monitor 1 effects. This fact is contradictory to the above-mentioned assumption that $G_R$, $G_G$, and $G_B$ in equations (2) to (4) are proportional to exposure amounts. However, FIG. 5 is presented to indicate that signals are processed in a region where the above parameters are proportional to the exposure amounts in practice.

FIG. 6 shows R, G, and B exposure amount-density curves of a normal color film. FIG. 6 demonstrates that the exposure amount-density curves differ in accordance with R, G, and B colors. That is, a chromaticity of white cannot normally be maintained in an exposure process. For this reason, line OWF in FIG. 3C corresponding to line OW in FIG. 3A is not a straight line.

FIG. 7 illustrates that assuming that a color representation region of a film is a triangular region surrounded by "x"s, since matrix A cannot be a unit matrix, saturation is decreased, and the color representation region corresponds to a region enclosed within a broken curve. Matrix A is represented as follows:

$$\begin{vmatrix} D_R \\ D_G \\ D_B \end{vmatrix} = K'' \cdot A \cdot \begin{vmatrix} E_R \\ E_G \\ E_B \end{vmatrix}$$

That is, when a color space of R, G, and B beams incident on a film surface and an RGB space of color representation by photosensitivity characteristics and reflection characteristics of a film are measured by an identical photometric standard with reference to a CIE chromaticity, their color representation regions are different from each other. In this case, voltages W ($V_R$max, $V_G$max, $V_B$max) corresponding to white of maximum sensitivity of a monitor film are mapped to WF ($D_R$max, $D_G$max, $D_B$max). Constants $K_R''$ and the like in equations (5) to (7) are adjusted while white-balancing to allow coordinates of these "white" points to coincide. However, as can be seen from the graph, even if the chromaticities of "white" points of maximum luminance are controlled to coincide on the CIE coordinate system in this manner, point P ($V_R$, $V_G$, $V_B$) of a normal color cannot coincide with the chromaticity of corresponding point Q ($D_R$, $D_G$, $D_B$).

The present invention is not limited to the above embodiment, and various changes and modifications may be made within the spirit and scope of the invention.

Figure 8:
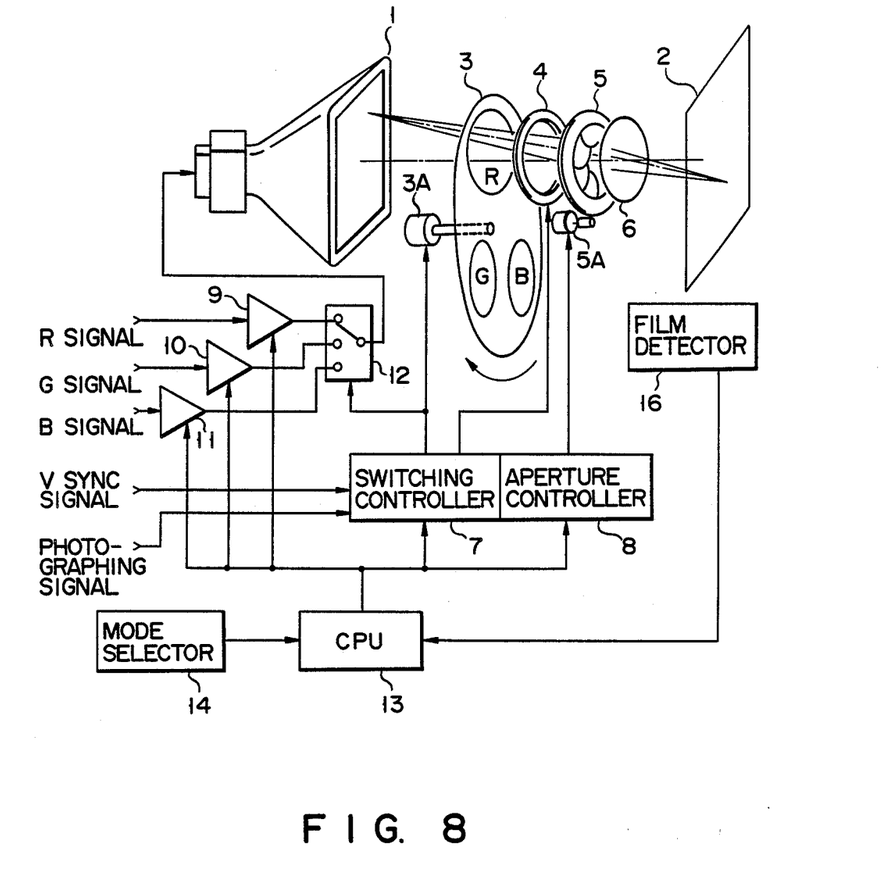
FIG. 8 is a block diagram of a color sequential photographic apparatus according to another embodiment of the present invention.

For example, in another embodiment of the present invention shown in FIG. 8, film detector 16 for automatically detecting a film identification code, attached to film 2 in advance, to automatically determine the type of film is arranged in place of film selector 15.

The present invention may be applied to a color sequential photographic apparatus for complementary primaries, i.e., yellow (Y), magenta (M), and cyan (C) as complementary colors of primaries R, G, and B.

What is claimed is:

1. A color sequential photographic apparatus comprising:
   monochrome display means on which an image is scanned and displayed with an adjustable display luminance;
   an optical system for guiding the displayed image on said display means onto a color film;
   filter means, having three primary color filters, for sequentially inserting said primary color filters in said optical system;
   variable aperture means located within said optical system and capable of varying an aperture value of said optical system;
   display control means for controlling the display luminance of said display means;
   exposure time control means for controlling a film exposure time of each of three images corresponding to three primary colors by sequentially displaying the images on said display means during a predetermined interval while simultaneously using said filter means in associated with the images displayed on said display means; and
   photographing control means for controlling at least one of said display control means, said variable aperture means, and said exposure time control means, in accordance with a desired photographing condition;
   said photographing control means including:
      film information input means for detecting and inputting information indicating the type of said color film; and
      characteristic control means for controlling a control characteristics of at least one of said display control means, said variable aperture means, and said exposure time control means, in accordance with the information input from said film information input means.

2. An apparatus according to claim 1 wherein said exposure time control means comprises means for controlling the film exposure times in synchronism with display scanning performed by said display means.

3. An apparatus according to claim 1, further comprising a shutter which is located within said optical system and is controlled in synchronism with the inserting of said color filters by said filter means.

4. A color sequential photographic apparatus comprising:
   monochrome display means on which an image is scanned and displayed with an adjustable display luminance;
   an optical system for guiding the displayed image on said display means onto a color film to produce a photographed image;
   filter means, having three primary color filters, for sequentially inserting said primary color filters in said optical system;
   variable aperture means located within said optical system and capable of varying an aperture value of said optical system;
   display control means for controlling the display luminance of said display means;
   exposure time control means for controlling a film exposure time of each of three images corresponding to three primary colors by sequentially displaying the images on said display means during a predetermined interval while simultaneously using said filter means in association with the image displayed on said display means; and
   photographing control means for controlling at least one of said display control means, said variable aperture means, and said exposure time control means, in accordance with a desired photographing condition;
   said photographing control means including:
      condition setting means for setting a photographing condition, said condition setting means comprising means for selecting one of a mode giving priority to a decrease in said exposure times, a mode giving priority to sharpness in the photographed image, and a mode giving priority to color saturation in the photographed image; and
      characteristic control means for controlling a control characteristic of at least one of said display control means, said variable aperture means, and said exposure time control means in accordance with the photographic condition set by condition setting means.

5. An apparatus according to claim 4, wherein said exposure time control means comprises means for controlling the film exposure times in synchronism with display scanning performed by said display means.

6. An apparatus according to claim 4, further comprising a shutter which is located within said optical system and is controlled in synchronism with the inserting of said color filters by said filter means.

7. A color sequential photographic apparatus comprising:
   monochrome display means on which an image is scanned and displayed with an adjustable display luminance;
   an optical system for guiding the displayed image on said display means onto a color film to produce a photographed image;
   filter means, having three primary color filters, for sequentially inserting said primary color filters in said optical system;
   variable aperture means located within said optical system and capable of varying an aperture value of said optical system;
   display control means for controlling the display luminance of said display means;
   exposure time control means for controlling a film exposure time of each of three images corresponding to three primary colors by sequentially displaying the images on said display means during a predetermined interval while simultaneously using said filter means in association with the images displayed on said display means; and photographing control means for controlling at least one of said display control means, said variable aperture means, and said exposure time control means, in accordance with a desired photographing condition;

said photographing control means including:

condition setting means for setting a photographing condition, said condition setting means comprising means for selecting one of a mode giving priority to a decrease in said exposure times, a mode giving priority to sharpness in the photographed image, and a mode giving priority to color saturation in the photographed image;

film information input means for inputting information indicating the type of said color film; and characteristic control means for controlling a control characteristic of at least one of said display control means, said variable aperture means, and said exposure time control means, in accordance with the photographing condition set by said condition setting means and the information input from said film information input means.

8. An apparatus according to claim 7, wherein said exposure time control means comprises means for controlling the film exposure times in synchronism with display scanning performed by said display means.

9. An apparatus according to claim 7, further comprising a shutter which is located within said optical system and is controlled in synchronism with the inserting of said color filters by said filter means.

10. A color sequential photographic apparatus comprising:

monochrome display means on which an image is scanned and displayed with an adjustable display luminance;

an optical system for guiding the displayed image on said display means onto a color film;

filter means, having three primary color filters, for sequentially inserting said primary color filters in said optical system;

variable aperture means located within said optical system and capable of varying an aperture value of said optical system;

display control means for controlling the display luminance of said display means;

exposure time control means for controlling a film exposure times of each of three images corresponding to three primary colors by sequentially displaying the images on said display means during a predetermined interval while simultaneously using said filter means in association with the images displayed on said display means; and photographing control means for controlling at least one of said display control means, said variable aperture means, and said exposure time control means, in accordance with a desired photographing condition;

said photographing control means including:

condition setting means for setting a photographing condition;

film information input means for detecting and inputting information indicating the type of said color film; and characteristic control means for controlling a control characteristic of at least one of said display control means, said variable aperture means, and said exposure time control means in accordance with the photographing condition set by said condition setting means and the information input from said film information input means.

11. An apparatus according to claim 10, wherein said exposure time control means comprises means for controlling the film exposure times in synchronism with display scanning performed by said display means.

12. An apparatus according to claim 10, further comprising a shutter which is located within said optical system and is controlled in synchronism with the inserting of said color filters by said filter means.

* * * * *